United States Patent [19]

Piniecki

[11] Patent Number: 5,766,297

[45] Date of Patent: Jun. 16, 1998

[54] SYSTEM FOR PRODUCING CEMENTITIOUS MATERIALS FROM FERROUS BLAST FURNACE SLAGS

[75] Inventor: Ronald R. Piniecki, Baltimore, Md.

[73] Assignee: Blue Circle, Inc., Marietta, Ga.

[21] Appl. No.: 698,681

[22] Filed: Aug. 27, 1996

Related U.S. Application Data

[60] Continuation of Ser. No. 262,836, Jun. 21, 1994, Pat. No. 5,575,827, which is a division of Ser. No. 23,378, Feb. 26, 1993, Pat. No. 5,374,309.

[51] Int. Cl.$^6$ ..................................................... C03B 5/23
[52] U.S. Cl. ..................................................... 65/141; 65/19
[58] Field of Search .......................... 65/19, 141; 266/44, 266/201

[56] References Cited

U.S. PATENT DOCUMENTS

| | | | |
|---|---|---|---|
| 747,921 | 12/1903 | Passow | 106/789 |
| 1,343,948 | 6/1920 | Wennerström | 106/789 |
| 1,502,793 | 7/1924 | Maguet | 106/789 |
| 1,826,433 | 10/1931 | Pistor et al. | 501/154 |
| 1,834,799 | 12/1931 | Nickel et al. | 106/782 |
| 1,916,402 | 7/1933 | Allen | 65/19 |
| 1,947,488 | 2/1934 | Newhouse | 106/679 |
| 2,911,671 | 11/1959 | Tolman | 65/19 |
| 3,230,103 | 1/1966 | Minnick | 106/117 |
| 3,298,822 | 1/1967 | Arvay et al. | 65/19 |
| 3,488,203 | 1/1970 | Anderson et al. | 106/117 |
| 3,833,384 | 9/1974 | Thümmler et al. | 75/24 |
| 3,876,749 | 4/1975 | Horvath et al. | 423/119 |
| 4,141,722 | 2/1979 | Takai et al. | 75/24 |
| 4,174,961 | 11/1979 | Wolfs et al. | 75/30 |
| 4,174,974 | 11/1979 | Fondriest | 106/103 |
| 4,242,313 | 12/1980 | Torma | 423/112 |
| 4,256,504 | 3/1981 | Dunstan, Jr. | 106/109 |
| 4,404,031 | 9/1983 | Sudoh et al. | 106/90 |
| 4,432,800 | 2/1984 | Kneller et al. | 106/85 |
| 4,451,295 | 5/1984 | Sprouse | 106/89 |

(List continued on next page.)

FOREIGN PATENT DOCUMENTS

| | | |
|---|---|---|
| 379718 | 11/1907 | France . |
| 401493 | 8/1909 | France . |
| 920844 | 4/1947 | France . |
| 427227 | 4/1935 | United Kingdom . |
| 94/17006 | 1/1993 | WIPO . |

OTHER PUBLICATIONS

"Standard Test Method for Compressive Strength of Hydraulic Cement Mortars (Using 2–in. or 50–mm Cube Specimans)" *American Society for Testing and Materials:* Designation: C 109–90, pp. 60–64. (no month avail).

"Ground Granulated Blastfurnace Slag for Use with Portland Cement" *British Standard:* BS 6699 : 1992. (no month avail).

"Methods of Testing Cement; Determination of Strength" *European Standard:* EN 196, AC 1, Jul. 1989.

"Methods of Testing Cement; Determination of Strength" *European Standard:* EN 196, AC 2, Oct. 1989.

*Primary Examiner*—Donald E. Czaja
*Assistant Examiner*—Sean Vincent
*Attorney, Agent, or Firm*—Baker & Botts, L.L.P.

[57] ABSTRACT

Processes and systems for producing cementitious materials from ferrous blast furnace slags. Processes comprise mixing of a source of CaO with molten slag flowing from at least one slag tap hole of a blast furnace. Sufficient CaO is mixed with the molten slag to raise the ratio of CaO to $SiO_2$, the C/S Ratio, of the slag to between about 1.06 and 1.25, while maintaining the Base Number of the molten slag less than about 1.55. The slag is then water granulated and ground to a predetermined degree of fineness. An activator then is added to the ground granulated slag. The C/S Ratio of the granulated slag determines the degree of fineness to which the granulated slag must be ground to achieve a desired hydration rate in the resultant cementitious material. Cementitious materials with C/S Ratios in this range may be ground less finely, yet possess the same hydration rates, as other more finely ground cementitious materials.

14 Claims, 4 Drawing Sheets

U.S. PATENT DOCUMENTS

| | | | |
|---|---|---|---|
| 4,490,178 | 12/1984 | Loggers et al. | 106/118 |
| 4,652,310 | 3/1987 | Tomani et al. | 75/256 |
| 4,711,662 | 12/1987 | Hanada | 65/19 X |
| 4,761,183 | 8/1988 | Philip et al. | 106/117 |
| 4,780,144 | 10/1988 | Loggers | 106/118 |
| 4,789,532 | 12/1988 | Jons et al. | 423/240 |
| 4,802,922 | 2/1989 | Smart | 106/89 |
| 4,933,013 | 6/1990 | Sakai et al. | 106/85 |
| 4,957,556 | 9/1990 | Kunbargi | 106/693 |
| 4,961,787 | 10/1990 | Majumdar et al. | 106/692 |
| 4,971,627 | 11/1990 | Koslowski et al. | 106/752 |
| 5,030,289 | 7/1991 | Sattler et al. | 106/805 |
| 5,073,197 | 12/1991 | Majumdar et al. | 106/692 |
| 5,092,932 | 3/1992 | Lerke et al. | 106/714 |

SYSTEM FOR PRODUCING CEMENTITIOUS MATERIALS FROM FERROUS BLAST FURNACE SLAGS

This application is a continuation of application Ser. No. 08/1262,836, filed Jun. 21, 1994 entitled "SYSTEM FOR PRODUCING CEMENTITIOUS MATERIALS FROM FERROUS BLAST FURNACE SLAGS" now U.S. Pat. No. 5,575,827 which is a divisional of Ser. No. 08/023,378, filed Feb. 26, 1993, entitled A PROCESS AND SYSTEM FOR PRODUCING CEMENTITIOUS MATERIALS FROM FERROUS BLAST FURNACE SLAGS, now U.S. Pat. No. 5,374,309.

BACKGROUND OF THE INVENTION

1. Field of the Invention

This invention relates to improvements in the cementitious properties of granulated, ferrous blast furnace slags used to produce cementitious materials. Specifically, it relates to a process for mixing a source of calcium oxide (CaO) with molten ferrous blast furnace slag, such that the hydraulic reactivity of the slag after granulating is enhanced. When such slag is ground, cementitious properties that are the same as or similar to those of more finely ground cementitious materials can be achieved at a lower specific surface area, thereby saving production and energy costs. Moreover, improved properties can be achieved by grinding such slag to the same or similar specific surface area as that of a ground, granulated blast furnace slag produced without the addition of a source of CaO. The invention further relates to a system for performing this addition.

2. Description of the Related Art

Portland Cement is the most widely used cementitious material. It is manufactured by heating a finely ground and controlled blend of limestone (or another source of CaO, such as chalk) with an argillaceous material such as shale or clay to a temperature of about 3180° F. (1500° C.). When necessary, other sources of silica ($SiO_2$), such as sand; alumina ($Al_2O_3$), such as bauxite; and ferric oxide ($Fe_2O_3$), such as pyrites, may also be added. After it is cooled, the resultant clinker is mixed with gypsum (or a mixture of anhydrite and gypsum) and ground to a fine powder.

There are a number of different processes for making cementitious materials. In a wet process, the mixture of materials is ground with water to produce a slurry which is then fed to a rotary kiln. In this process, the fuel consumption in the kiln is generally high due to the need to dry, as well as to heat the materials. In a traditional dry process, the materials are ground dry to form a powder which is then fed to a kiln. This process generally has a lower fuel consumption than wet processes. Variants of these processes include a semi-wet process, in which water is partially removed from the slurry by filtration to form a cake of ground materials which then is fed to the kiln, or the Lepol process, in which a dry powder is first nodulized with the addition of some water after which the nodules are fed to the kiln.

In a suspension preheater process, the materials are ground dry to form a powder which is passed through a series of cyclones before it enters the kiln. In these cyclones, the powder mixes with waste gases from the kiln and is gradually heated, such that the powder may be reach a temperature of about 1590° F. (750° C.). As a consequence of this preheating, the fuel consumption in this process may be lower than in the processes described above.

The suspension preheater process may be modified by the addition of a combustion chamber between the cyclones and the rotary kiln in which about 50 percent of the total fuel required to produce a clinker can be fired. This process is known as a precalciner process. In this process, the powder may be heated to about 2014° F. (950° C.) before it enters the kiln. An advantage of this process is that a higher output may be attained for a given kiln size. Even in the more thermally efficient suspension preheater and precalciner processes, however, the clinker forming step is usually the most energy intensive in processes for making cementitious materials.

When the finely ground blend of materials is heated in any of the above processes, the argillaceous materials usually begin to de-hydrate at about 1272° F. (600° C.), and the calcareous materials may decarbonate at about 1908° F. (900° C.). At about 2756° F. (1300° C.) the mixture usually begins to melt, so that by about 3180° F. (1500° C.) about 25 percent of the mixture is molten. This liquid encourages the formation of clinker and promotes chemical reactions between the CaO, $SiO_2$, $Al_2O_3$ and $Fe_2O_3$, to form four chemical compounds commonly referred to as clinker minerals, which are described in Table I. All percentages expressed herein are by weight.

TABLE 1

| Chemical Formulae | Shorthand Nomenclature | Mineral Name | Typical Levels in Ordinary Portland Cement (OPC) (%) |
|---|---|---|---|
| $3CaO.SiO_2$ | $C_3S$ | Alite | 45–70 |
| $2CaO.SiO_2$ | $C_2S$ | Belite | 6–30 |
| $3CaO.Al_2O_3$ | $C_3A$ | Aluminate | 5–12 |
| $4CaO.Al_2O_3.Fe_2O_3$ | $C_4AF$ | Ferrite | 5–12 |

When clinker containing these minerals is ground to a fine powder and mixed with water, the aluminate reacts rapidly causing the mixture to set. For this reason, clinker may be ground with about five (5) percent gypsum (or another appropriate source of calcium sulfate ($CaSO_4$)) to control this reaction, so that grouts, mortars, or concretes prepared from cementitious materials can be placed and compacted (or poured) before hardening commences.

After setting, the cementitious material gains strength as the calcium silicate compounds hydrate. Alite is the main strength giving mineral in Portland Cement contributing to both early and late strengths, whereas belite is less reactive and only contributes to strengths typically fourteen (14) days after placement (or pouring). Both minerals react with water to form a non-crystalline, calcium silicate hydrate or C—S—H gel. In this gel, the ratio of CaO to $SiO_2$ (hereinafter the "C/S Ratio") is less than that in the unhydrated clinker minerals, and the CaO liberated as the minerals hydrate combines with water to form calcium hydroxide ($CA(OH)_2$).

Cementitious material users are particularly interested in setting and strength development characteristics, and for this reason, minimum strengths and both minimum and maximum setting times are specified in the ASTM (American Society For Testing and Materials) C150 standard specification for Portland Cements. In addition to the clinker minerals described in Table I, there are a number of minor components which form in the clinker from impurities in the raw materials or fuel. These minor components can influence both the clinker forming process and the hydraulic reactivity and cementitious properties of the resultant cementitious material. The level of alkalis, notably $K_2O$ and $Na_2O$, present in Portland Cement may be of particular concern. If cementitious materials are combined with aggregates containing reactive $SiO_2$ to make concrete, the alkalis from the cementitious material may react with this $SiO_2$ to form an expansive alkali silica gel which can lead to the cracking and break up of the concrete structure. Detecting and avoiding the use of aggregates containing reactive $SiO_2$ is difficult. Therefore, in order to avoid this problem, cementitious materials with a specified low alkali content are commonly used. Thus, a maximum equivalent $Na_2O$ of about 0.60 percent is included as an optional limit in the ASTM C150.

One way of safely using cementitious materials containing more than about 0.60 percent equivalent $Na_2O$ with aggregates containing reactive $SiO_2$, and of avoiding excessive expansion while at the same time reducing the total energy consumption to manufacture the cementitious materials, is to mix the Portland Cement with other materials which are not cementitious by themselves, but which are capable of reacting with the alkalis and $Ca(OH)_2$ liberated, as the Portland Cement hydrates to form additional cementitious hydrates. Suitable materials for this purpose include pozzolanic materials, such as power station fly ash and certain types of naturally occurring volcanic material, or latently hydraulic materials, such as ground, granulated blast furnace slag.

Slag, as used herein, refers to the material that remains after the smelting of a metallic ore, a process which entails the reduction of the ore to a molten state. Smelting of iron ore generally involves the combination of iron ore; a source of carbon, generally coke; and a flux, such as limestone, in a blast furnace. The terms "ferrous slag" or "ferrous blast furnace slag" refer to the slag that remains after the smelting of iron ore.

Pozzolanic materials are generally low in CaO and contain $SiO_2$ and $Al_2O_3$ in an active—usually vitreous—form, which react with the $Ca(OH)_2$ released by the hydrating Portland Cement. Latently hydraulic materials contain sufficient CaO, $SiO_2$, and $Al_2O_3$ to form their own calcium silicate and aluminate hydrates. The reactions may only be activated in suitably alkaline conditions, such as are achieved in the presence of hydrating Portland Cement or by adding small amounts of alkalis, such as sodium hydroxide or sodium carbonate, to the latently hydraulic material. Consequently, pozzolana and latently hydraulic materials, even when mixed with Portland Cement, do not react as fast as Portland Cement and as a result, contribute more to the late strength than to the early strength of a cementitious material. An advantage of their lower early reactivity, however, is that pozzolana and latently hydraulic materials produce less heat than hydrating Portland Cement during the early reaction stages. If only Portland Cement were to be used, the heat produced in large structures could subject the structure to excessive thermal stresses during the initial hardening and result in crack formation.

In addition to the advantages outlined above, mixing Portland Cement with ground, granulated blast furnace slag can improve the workability of concrete, mortar, or grout, thereby making it easier to place and compact (or pour). Mixing can also reduce the permeability of hardened concrete, mortar, or grout, thereby improving its durability. At high percentage slag mixtures, a resultant concrete, mortar, or grout may have sulfate resisting properties equal to or better than an ASTM Type V cement, as defined in ASTM C150.

Granulated ferrous blast furnace slag may be mixed with Portland Cement in various ways. The slag may be interground with the Portland Cement clinker and gypsum to produce a cementitious material. This is a common practice in continental Europe. Alternatively, it may be ground alone and then mixed with Portland Cement as is common practice in the United States of America and the United Kingdom. An advantage of having the ground, granulated blast furnace slag available separately is that it can be activated by the addition of alkalis, such as sodium hydroxide or sodium carbonate, without any Portland cement, for certain specific applications such as soil stabilization, as described in U.S. Pat. No. 4,761,183, and the solidification of mud for well cementing operations, as described by Cowan et al. in Paper SPE 24575 presented at the 67th Annual Technical Conference and Exhibition of the Society of Petroleum Engineers held in Washington, D.C. in October 1992.

In order to acquire hydraulic properties, blast furnace slag must be quenched rapidly to preserve the molten slag in a vitreous state. Two processes that are commonly used are granulation and pelletization. In granulation, the slag is quenched by the injection of a large quantity of water under pressure into the slag, i.e., water granulation. If the slag temperature prior to quenching is above the liquidus, water granulation yields a wet sand like material with a high degree of vitrification. The water is injected under pressure and at a sufficiently low temperature to quench the slag and break up the molten slag into small pieces. Because of its increased surface area, the molten slag cools quickly. In a pelletization process, the molten slag is directed onto a spinning drum together with a small quantity of water. The slag is then projected into the air and solidifies as small, round, and frequently hollow pellets. As a consequence of the slower quench rate, the degree of vitrification of pelletized slags is normally lower than that of granulated slags. If permitted to cool slowly or allowed to form large, slow cooling pieces, molten slag may crystalize and exhibit little or no cementitious qualities.

Despite the advantages gained by mixing Portland Cement with ground, granulated blast furnace slag, strength development remains an important property, and for this reason, it has been traditional in the United States of America to compare the strength measured in psi after about seven (7) and twenty-eight (28) days curing of a 50/50 blend of Portland Cement and ground, granulated blast furnace slag with unblended Portland Cement, as outlined in ASTM C989. This comparison has been expressed as a slag activity index (SAI). This ratio of strengths permits the comparison of the hydration rates of various types of cementitious materials.

The glass content and the composition of the slag, however, will also provide a guide to its hydraulic reactivity, and it is also common to consider the C/S Ratio, or the ratio of the combined CaO, MgO, and $Al_2O_3$ contents to the $SiO_2$ content (hereinafter the "Hydraulic Index"). In general, slag with the highest glass content, the highest C/S Ratio, and Hydraulic Index is preferred for use with Portland Cement. Nevertheless, the higher the C/S Ratio and Hydraulic Index the higher the slag melting temperature and the more difficult it is to quench the molten slag to a vitreous mass, without formation of crystalline phrases. Because slag is a by-product from the iron smelting (and steel-making) process, its composition is largely dictated by the composition of the iron ore, coke, and other raw materials and the efficiency of furnace operation.

Ferrous slag produced in the United States of America, however, usually has a C/S Ratio of about 1. Nevertheless, as the CaO content and thus, the C/S Ratio of the slag increase, the viscosity of the slag also increases. As the viscosity of the slag increases, however, the efficiency of operation of the blast furnace may decline. Further, sources of CaO may be relatively expensive components in the smelting of iron. Iron smelters, therefore, may seek to limit the amount of any source of CaO that they add to the smelting process, so that they can minimize the costs of smelting and maximize the efficiency of their furnaces.

For example in the United States of America, iron smelters will commonly monitor the Base Number of the molten slag produced by their furnaces.

Base Number=(CaO+MgO)/SiO$_2$.

When the Base Number exceeds about 1.55 and the C/S Ratio exceeds about 1.25, the viscosity of the slag may have significant adverse effects on blast furnace operations and efficiency. In the United States of America, where competition in the iron and steel industry is intense, iron smelters generally operate their furnaces to produce slag with relatively low C/S Ratios and Base Numbers. In other countries, however, C/S Ratios or Base Numbers may be higher due to furnace and raw material differences. As a consequence, the hydraulic reactivity of blast furnace slag may be below its potential and is often variable. To produce a suitable ground, granulated blast furnace slag from such slag, it is necessary to finely grind the slag to achieve very high surface areas to ensure it conforms with ASTM C989 and to vary the fineness of the grind, so that the variability of the product is reduced to a level acceptable to users. This results in high energy costs to grind the slag, lower output, and higher testing and manpower costs to monitor the slag quality and to adjust slag grinding operations.

Applicant has developed a process and system for incorporating a source of CaO into molten slag, such that the C/S Ratio of the slag rises, but the slag can still be successfully granulated to produce a highly vitreous mass. Such slag exhibits improved hydraulic reactivity. Therefore, Applicant's process permits less finely ground, granulated slags to be used to produce cementitious materials possessing qualities previously available only from more finely ground, granulated slags; thus reducing energy costs. Alternatively, Applicant's process permits the production of ground granulated slags with improved properties over previous granulated slags which were ground to the same fineness. With such slags, it is possible in certain applications to mix more ground, granulated blast furnace slag with the Portland Cement and still produce high quality cementitious materials.

SUMMARY OF THE INVENTION

This invention relates to a process for producing a cementitious material from molten ferrous slag. In this process, a source of CaO is mixed with the molten slag at a mixing point, so that a ratio of CaO to SiO$_2$, the C/S Ratio, in the molten slag in a range of about 1.06 to 1.25 is obtained, and the slag has a Base Number less than about 1.55. The molten slag is then granulated, and the granulated slag is ground to a predetermined degree of fineness. The degree of fineness is determined by the chemical composition of the granulated slag and the hydraulic qualities desired in the cementitious material. An activator, which may be an alkali selected from a group consisting of potassium hydroxide, sodium hydroxide, and calcium hydroxide, may then be added to the ground, granulated slag to produce the cementitious material.

The source of CaO may be quicklime, such as dolomitic quicklime; lime; or limestone. Quicklime is a calcined material the major portion of which is CaO (or CaO in natural association with a lesser amount of MgO). Lime generally refers to hydrated or slaked lime which is a dry powder obtained by treating quicklime with enough water to satisfy its chemical affinity for water under the conditions of its hydration. Lime also may be associated with excess water, resulting in a moist or slurried state. Limestone is an uncalcined material the major component of which is calcium carbonate (CaCO$_3$).

Additionally, the molten slag's chemical composition can be determined, and the molten slag's rate of flow can be measured before the source of CaO is mixed with the molten slag.

In addition, the slag can be granulated by injecting a fluid, such as water, or a combination of fluids, such as water and air, into the slag at a sufficiently low temperature, in sufficient quantity, and under sufficient pressure to quench and break up the molten slag.

If the source of CaO is lime, it may also be necessary to mix a low volatile fuel, e. g., coke fines or rice hulls, with the lime and the molten slag, whereby sufficient heat is generated in the molten slag to de-hydrate the lime. It also may be necessary to add oxygen (O$_2$) to the molten slag to facilitate combustion of this low volatile fuel. Alternatively, if the source of CaO is limestone, it may be necessary to mix a low volatile fuel, e.g., coke fines or rice hulls, with the limestone and the molten slag, whereby sufficient heat is generated in the molten slag to decarbonate the limestone. It again may also be necessary to add oxygen (O$_2$) to the molten slag to facilitate combustion of the low volatile fuel. Further, even when the source of CaO is quicklime, it may be necessary to add a low volatile fuel to the molten slag to generate heat in the slag to promote fusion.

Further, a volatile fuel, e.g., wood, may be added to the molten slag, whereby the slag is percolated by gases released during the combustion of the volatile fuel. This percolation may accelerate the mixing of the molten slag and the source of CaO and serve to break up any crystalline layer created by the addition of an excess quantity of fines of the source of CaO to the molten slag.

This invention also relates to a system for producing a cementitious material from molten ferrous slag flowing from a source of such slag, e.g., a ferrous blast furnace. It is of course possible to re-melt ferrous slag that has previously been generated and allowed to cool. This, however, entails additional energy costs.

The system comprises a slag runner for directing the molten slag to a mixing point; an injection bin; means for delivering a source of CaO to a centrally located storage bin; and means for transferring the source of CaO from the storage bin to the injection bin, whereby the quantity of fines of the source of CaO that are produced during the transfer is strictly controlled. If excessive fines are produced and mixed with the molten slag, they will cause the C/S Ratio at the surface of the slag to rise rapidly. The surface of the molten slag may then crystalize and prevent mixing of the source of CaO with molten slag beneath this crystallized surface.

Examples of means suitable for delivering the source of CaO to the centrally located storage bin may include a pneumatic pipeline and a spur and railcars fitted with attachments for offloading bulk dry material. Suitable railcars may include covered hoppers capable of carrying about one hundred tons of a source of CaO.

The system further may comprise means for measuring the molten slag's rate of flow in the slag runner and means for determining the molten slag's chemical composition. A flowmeter is an example of a mechanism suitable for measuring the molten slag's rate of flow. The molten slag's rate of flow in the slag runner may also be less accurately, but adequately, measured by determining the depth of the molten slag in the slag runner, such as by depth gradations on the slag runner, and by determining the rate of flow of the molten slag past a point on the slag runner. Means for determining the molten slag's chemical content may comprise a sampling device, a sample transporting device, and testing equipment capable of identifying and measuring the quantity of chemical components within a sample of molten slag. The system further may comprise means for mixing the source of CaO with the molten slag in the slag runner at a predetermined rate, means for granulating the molten slag, means for measuring the granulated slag's chemical composition, and means for grinding the granulated slag to a predetermined degree of fineness. In one embodiment, the means for granulating may comprise a granulating station at which a fluid at a temperature sufficiently low to quench the slag can be injected into the molten slag in sufficient quantity and at sufficient pressure to granulate the molten slag.

Additionally, the system may comprise means for collecting and removing caustic dust, e.g., dust containing CaO, released during the mixing of the source of CaO with the molten slag. The means for collecting and removing this caustic dust may comprise a dedusting chamber surrounding the mixing point; a fan, whereby air and the dust are drawn from the chamber; and a scrubber or dry dust collector, whereby the dust and air drawn from the chamber are separated.

In addition, the means for transferring the source of CaO from the storage bin to the injection bin may comprise a pneumatic transfer vessel in communication with the storage bin and capable of receiving a quantity of the source of CaO under pressure from the storage bin. It may further comprise at least one dry air compressor to pressurize the pneumatic vessel and for propelling the source of CaO through the piping connecting the vessel to the injection bin and a junction for providing dry compressed air from the dry air compressor or compressors to the piping.

As noted above, the source of CaO may be quicklime, such as dolomitic quicklime; lime; or limestone. If the source of CaO is lime, the system can further comprise means for mixing a low volatile fuel with the lime and the molten slag, whereby sufficient heat is generated in the slag to de-hydrate the lime. It also can comprise means for injecting oxygen ($O_2$) into the molten slag, such as by a ceramic oxygen lance coupled with a source of oxygen ($O_2$).

If, however, the source of CaO is limestone, the system may further comprise means for mixing a low volatile fuel with the limestone and the molten slag, whereby sufficient heat is generated in the slag to decarbonate the limestone. It also may comprise means for injecting oxygen ($O_2$) into the molten slag, such as by a ceramic oxygen lance coupled with a source of oxygen ($O_2$). Further, even when the source of CaO is quicklime, it may be necessary to add a low volatile fuel or oxygen ($O_2$), or both, to the molten slag in the manner described above, to generate heat in the molten slag. A suitable mechanism for mixing a low volatile fuel with the molten slag could include a volumetric feeder of sufficient capacity located adjacent to the mixing point. Alternatively, the low volatile fuel may be mixed with the source of CaO in a single feeder and mixed simultaneously with the molten slag.

It is an object of this invention to save energy and energy costs in the manufacture of cementitious materials. It is a feature of this invention that a source of CaO is mixed with molten slag to achieve fusion. It is an advantage of this invention that depending on the source of CaO chosen little or no fuel need be added in this process (or by this system) to achieve the desired fusion nor need the operations of the blast furnace be altered to produce molten slag at a higher temperature.

It is also an object of this invention to reduce energy use, energy costs, work, and expenses associated with the grinding of the granulated slag. It is a feature of this invention that slag with C/S Ratios between about 1.06 and 1.25 and Base Numbers less than about 1.55 that have been granulated by the injection of a sufficient quantity of fluid(s) at a temperature sufficiently low to quench the molten slag and under sufficient pressure have increased hydraulic reactivity over other granulated slags at all degrees of fineness of grind. It is an advantage of this invention that cementitious materials produced by this process and in this system possess the same qualities as other more finely ground cementitious materials. This also results in higher production rates of cementitious materials by this process.

It is a further object of this invention that cementitious materials are produced with hydraulic qualities similar to Portland Cement, but at a lower cost. It is a feature of this invention that the cementitious material is manufactured from ferrous blast furnace slag. Further, advantages of this invention are that more slag—a waste product—can be recycled and that the operation of the blast furnace need not be modified to produce slag suitable for this process.

It is an additional object of this invention to utilize slag produced from blast furnaces which produce slag with lower C/S Ratios and lower Base Numbers, such as those currently operated in the United States of America, to manufacture cementitious materials exhibiting improved hydraulic reactivity. It is a feature of this invention that the predetermined amounts of a source of CaO are mixed with the molten slag after it leaves the blast furnace to improve the hydraulic qualities of a resultant cementitious material. It is an advantage of this invention that blast furnaces can continue to operate within the parameters imposed by competitive market forces and produce molten slag suitable for the manufacture of cementitious materials possessing qualities similar to those of Portland Cement.

Other objects, features, and advantages will be apparent when the detailed description of the invention and the drawings are considered.

DETAILED DESCRIPTION OF THE INVENTION

Figure 1:
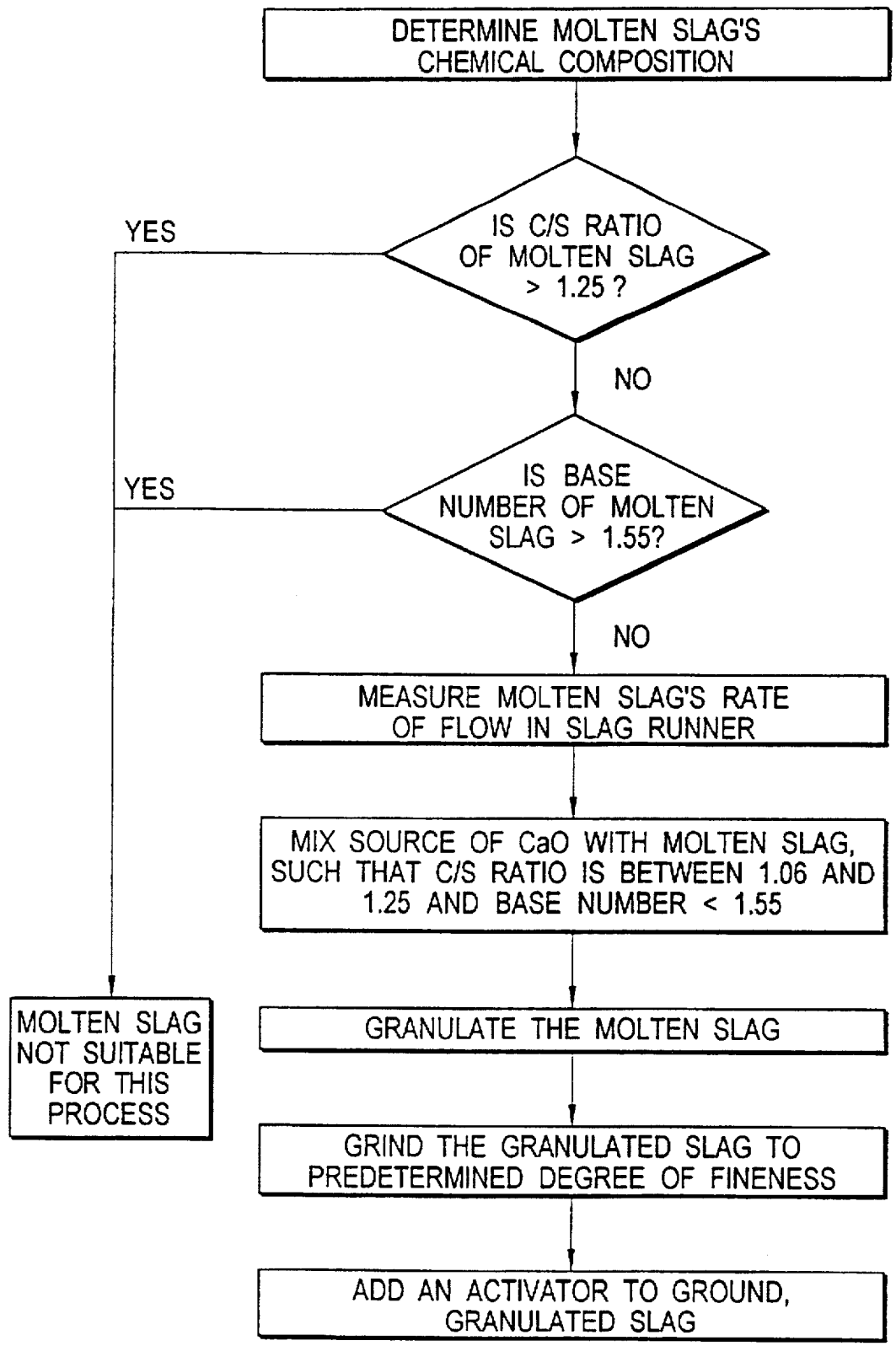
FIG. 1 is a flow chart for a description of a preferred embodiment of the process of the invention.

Referring to FIG. 1, the flow chart indicates, a preferred embodiment of the process for enhancing the cementitious properties e.g., the hydration rates or hydraulic reactivity, of ferrous blast furnace slags. The process may save energy costs by reducing the grinding and/or the quantity of activator, particularly Portland Cement, required to produce cementitious materials possessing predetermined hydraulic qualities.

Molten ferrous slag is a by-product of the smelting of iron, and most blast furnaces are equipped with one or more slag runners, i.e., channels made of fire brick, castable refractory material, or similar materials, which are built with constant gradients, to direct molten slag away from the blast furnace tap hole(s). Initially, molten ferrous blast furnace slag (hereinafter "molten slag") may be drawn from an operating blast furnace. Molten slag flows from a blast furnace at a temperature of between about 2600° and 2650° F. (1226° and 1250° C.). The amount of molten slag produced and its chemical composition may depend on the quality of the iron ore smelted and the amount of iron produced by the blast furnace operations. Further, the chemical composition of the slag may also depend on the quality of the ingredients used in the smelting process. For example, limestone is commonly used as a fluxing material. If more limestone is added to the furnace, the CaO content of the resultant slag may increase.

Molten slag commonly has a C/S Ratio in the range of about 0.90 to 1.40. As noted above, however, as the C/S Ratio of slag increases, its viscosity may also increase. Because of the competitive market for iron and steel in the United States of America, U.S. iron smelters strive to operate their blast furnaces efficiently, i.e., to produce "lean" slags with low C/S Ratios, low Base Numbers, and, consequently, low viscosities. For example, at Bethlehem Steel's Sparrows Point Facility in Sparrows Point, Md., U.S.A., slag C/S Ratios are generally in the range of about 0.95 to 1.05. Where furnace operating conditions and raw materials differ, slags may be produced with higher C/S Ratios. Slags with C/S Ratios greater than about 1.25 or with Base Numbers greater than about 1.55, however, are not suitable for this process.

It is preferred that the chemical content of the molten slag is determined before the source of CaO is mixed with it. This may be done by standard sampling techniques and laboratory analysis. Blast furnace operators commonly run historical chemical analysis on each casting, so that the efficiency of the blast furnace operations can be continuously monitored. Nevertheless, for this process, sampling equipment, laboratory testing equipment, and trained laboratory personnel are preferably available for real time testing of the molten slag's composition. Automated testing equipment capable of continuously testing and reporting the chemical composition is preferred for accomplishing this step. While various chemical tests can be performed, it is also preferred that at least the CaO, MgO, $SiO_2$, and $Al_2O_3$ contents are measured, and the C/S Ratio and Base Number are calculated.

It is also preferred that the rate of flow of the molten slag is measured. The rate of flow of the molten slag can be measured in tons per minute (TPM). For example, at Bethlehem Steel's Sparrows Point Facility, the rate of flow of the slag may average about three (3) TPM per slag runner, but may range between about zero (0) and ten (10) TPM. The rate of flow of the slag may be adequately calculated by observing the depth of the slag in the slag runner and determining the rate of the flow of molten slag past a point on the slag runner. Preferably, however, the rate of flow of the molten slag may be measured by an automatic flowmeter which can provide continuous measurement of the rate of flow of the molten slag.

If the chemical composition and rate of flow of the molten slag are known or can be calculated by the means described above, the amount of the source of CaO required to achieve a desired range of C/S Ratios and Base Numbers also can be calculated. The preferred source of CaO is quicklime, and dolomitic quicklime is the preferred type of quicklime. Quicklime is preferred because it fuses with the molten slag at temperatures in the range of about 2600° to 2650° F. (1226° to 1250° C.). Therefore, no additional heat or fuel to produce heat may need to be added to the molten slag to perform the process. When using quicklime as the source of CaO, current tests have shown that increases in the CaO content of the molten slag of up to about 4.0 percent +/-0.5 percent may be attained without the addition of fuel to generate additional heat in the molten slag.

If lime, such as slaked or hydrated lime, is the source of CaO, it may be necessary to add a low volatile fuel, e.g., coke fines or rice hulls, to the molten slag in order to generate sufficient heat to de-hydrate the lime. It also may be necessary to add oxygen ($O_2$) to the molten slag to facilitate the combustion of the low volatile fuel.

If, however, limestone is the source of CaO, it also may be necessary to add a low volatile fuel to the molten slag in order to generate sufficient heat to decarbonate the limestone, i.e., reduce the $CaCO_3$ to CaO and $CO_2$. It also may be necessary to add oxygen ($O_2$) to the molten slag to facilitate the combustion of the low volatile fuel.

The mixing of the source of CaO and the molten slag can be accomplished in several ways. The least expensive and, therefore, a preferred method is to supply a source of CaO ground to various degrees of fineness, such that the source of CaO will sink into the molten slag and disperse throughout the molten slag as it dissolves. It is preferred that if quicklime is the source of CaO, the quicklime should be crushed or ground to an average diameter of about 0.375 inches (0.953 cm). It is also preferred that the source of CaO does not contain an excessive amount of fines. Fines tend to float on the surface of the molten slag and to saturate the surface layer of the molten slag with CaO, as they dissolve. This local saturation may cause the C/S Ratio and the viscosity of the surface layer of the molten slag to increase rapidly. The increase in the C/S Ratio also may cause the crystalline phase preference of the surface layer to increase. A layer of crystalline slag may then form on the surface of the molten slag and prevent the desired mixing of the molten slag below the crystalline layer and the source of CaO.

There are several methods to inhibit the formation of such a crystalline layer and to encourage proper mixing, including the physical mixing of the molten slag and the source of CaO and the addition of means for creating turbulence in the molten slag at the mixing point. A preferred method is to add a volatile fuel, such as a wooden board, to the molten slag at the mixing point. This volatile fuel will burn in the molten slag and produce gasses that will percolate through the slag and may accelerate the mixing of the molten slag and the source of CaO. Other means for creating turbulence in the slag flow at the mixing point are disclosed in the description of the system for performing this process.

After the source of CaO has been mixed with the molten slag, the molten slag is granulated at a granulating station. Granulating the molten slag comprises breaking up and quenching the molten slag by means of a quenching fluid. The purpose of granulating the molten slag is to obtain vitreous granulated slag, e.g., granulated slag with a glass content of at least about 90 percent. If the quenching fluid(s) is(are) injected into the slag at sufficiently high pressure, it(they) may break up the molten slag into small pieces. Small pieces may cool more rapidly than larger pieces and may achieve a higher degree of vitrification. Slag, which is permitted to cool slowly and, therefore, to crystalize, may exhibit little or no cementitious qualities. Further, as the C/S Ratio of molten slag increases, so does its melting temperature thereby increasing the risk of crystalline phases forming at a given slag temperature.

Preferably, the quenching fluid is a liquid or a gas, or both, which is(are) injected into the molten slag at a temperature sufficiently low to quench the slag and in sufficient quantity and under sufficient pressure to granulate the molten slag. It is further preferred that the quenching fluid is water at ambient temperature and that it is injected into the molten slag at about ten (10) times the rate of flow of the molten slag, e.g., if the rate of flow of the slag is about three (3) TPM, water is preferably injected into the slag at a rate of about 30 TPM, and at a pressure of about 30 psi (1551 torr).

Regardless of the quality of the granulation, it may not be possible to achieve a degree of vitrification greater than in the range of about 90 to 95 percent. Nevertheless, some slag crystal formation may not only be unavoidable, but indicative of the efficiency of the mixing of CaO and the molten slag and of the granulation. After granulation, microscopy or x-ray diffraction (XRD) scans can be used to determine the degree of vitrification of the granulated slag. At C/S Ratios greater than about 1.06, merwinitic crystallites have been detected in granulated slag. Merwinite ($Ca_3MgSi_2O_8$) crystallizes at temperatures in the range of about 2600° to 2650° F. (1226° to 1250° C.) at high C/S Ratios. The presence of some merwinitic crystals may indicate that the molten slag with a C/S Ratio in the range of about 1.06 to 1.25 was properly granulated. When slag is cooled too slowly, melilitic crystallites have been detected by microscopy and XRD scans. Melilite (($Na,Ca)_2(Mg,Al)(Si,Al)_2O_7$) crystallizes at a temperature of about 2400° F. (1132° C.). The molten slag normally must cool at a relatively slow rate through this temperature in order for melilitic crystallites to form. Therefore, it is preferred that some merwinitic crystallites are detected to confirm the efficiency of the granulation. Further, the presence of these merwinitic crystallites has shown few or no factors disadvantageous to the slag's hydraulic qualities or cementitious properties of cementitious materials manufactured from the slag.

The granulated slag may then be ground to a predetermined degree of fineness. The degree of fineness may depend on the desired hydration rate of the cementitious material and the chemical composition of the granulated slag. As noted above, the hydration rate of such cementitious materials is dependent in part on the degree of fineness of the grinding. Because cementitious materials produced with increased C/S Ratios in accordance with this process may exhibit increased hydraulic reactivity, a coarser grind of these cementitious material may be used to obtain the properties of a finer grind of other granulated slags. This results in higher production rates of cementitious materials produced by this process.

A regression analysis was performed comparing the degree of fineness of the grind measured in Blaine for various samples and the percentage change in CaO content of the slag and the Seven (7) Day SAI values. Over the course of this analysis, one (1) micron was found to equal about 615 Blaine. The Seven (7) Day SAI values were used because they are the critical values in the ASTM C989, incorporated herein by reference, testing. The following relation was found to exist between the variables:

7 Day SAI=0.01 (Blaine)+3.91 (CaO)−119.94

(+/−3.15 percent at 99 percent confidence).

Solving for the derivatives of this equation, i.e., (d 7 Day SAI)/(d CaO) and (d 7 Day SAI)/(d Blaine), yielded the following results:

One (1) percent Change in CaO=3.91 percent change on 7 Day SAI

391 Blaine=3.91 percent change on 7 Day SAI.

Therefore, a change of about one (1) percent in CaO content should be equivalent to a change of about 391 Blaine or about 0.64 microns of fineness.

Figure 2:
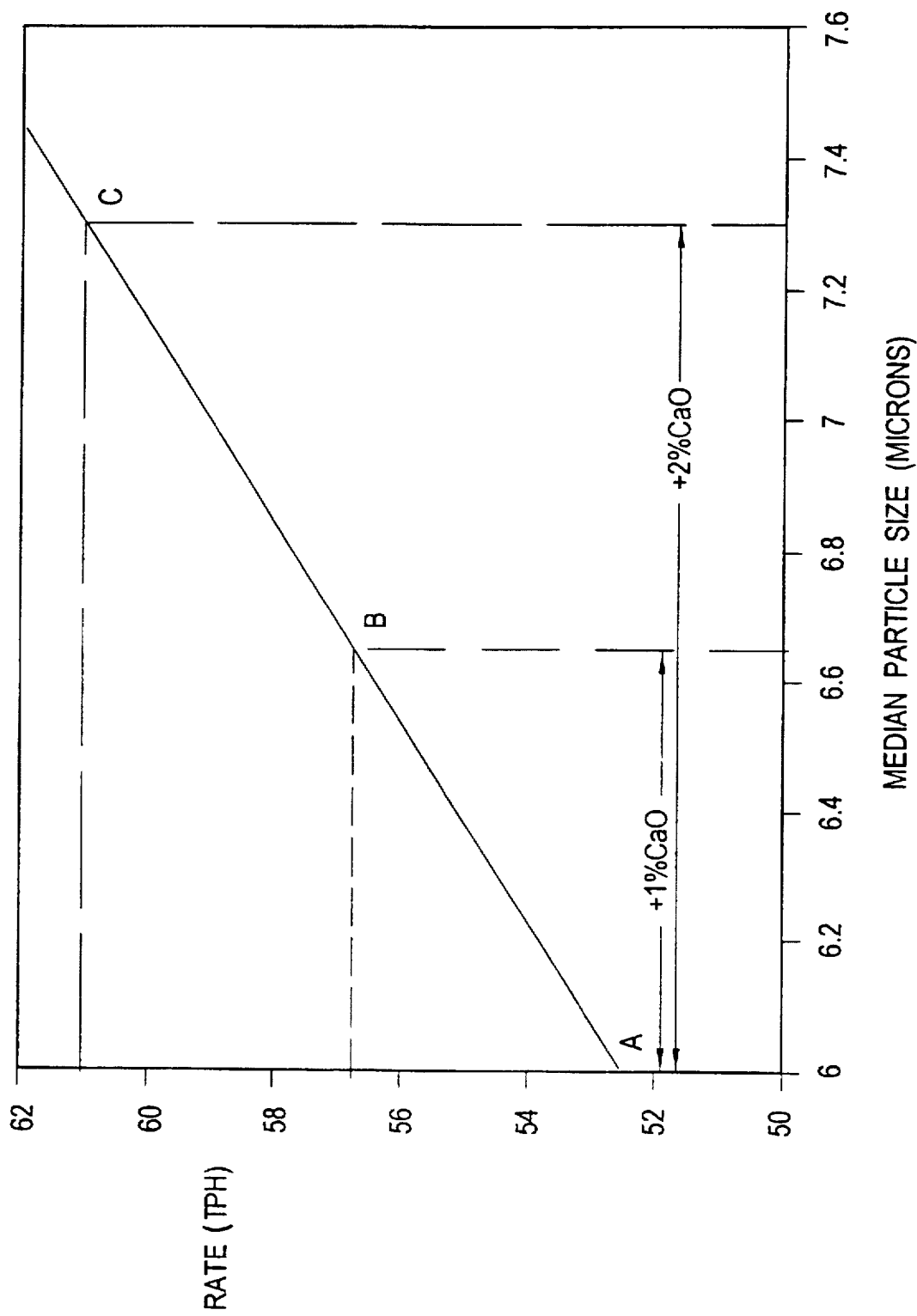
FIG. 2 is a graph depicting the relation between median particle size and ball mill grinder production rates in a preferred embodiment of the process.

Referring to FIG. 2, the graph depicts the relationship between increases in median particle size, due to increases in slag CaO content, and increases in ball mill grinder production rates. Ball mill grinder production rates are measured in tons per hour (TPH). Median particle size is indicated in microns as measured by a Microtrac. Point A represents current ball mill grinder production at a predetermined degree of fineness. Addition of a source of CaO sufficient to raise the CaO content of the granulated slag by about one (1) percent permits the slag to be less finely ground and increases the ball mill grinder production rate. The increase in both variables is identified by Point B in FIG. 2. A two (2) percent increase in CaO content would permit the granulated slag to be even less finely ground and would increase the ball mill grinder production rate by 8.7 TPH. See FIG. 2, Point C.

In order to convert the ground granulated slag into a cementitious material with properties similar to those of Portland Cement, an activator must be added. Preferably, the activator is an alkali selected from a group consisting of potassium hydroxide, sodium hydroxide, and calcium hydroxide. It is further preferred that the activator is obtained by combining the ground, granulated slag with Portland Cement. When water is added to Portland Cement, an excess of calcium hydroxide is produced which creates the preferred alkaline conditions for activating the ground, granulated slag.

The following example is a further illustrative disclosure of the process described above.

EXAMPLE

Samples of granulated slag were taken at Bethlehem Steel's Sparrows Point Facility (1) during normal blast furnace operations and (2) after dolomitic quicklime had been added to the molten slag in accordance with the process described above. These samples were dried in an oven at about 318° F. (150° C.), so that the water content of the granulated slag is reduced to a range of about two (2) to three (3) percent. The samples were then analyzed in a laboratory, and their chemical composition, glass content (or degree of vitrification) as determined by XRD scan in accordance with British Standard BS6699, and crystalline phase as determined by powder XRD scan are set forth in Table II. This table indicates that the quicklime added to the molten slag reacted with and was assimilated into the slag. As a result, the C/S Ratio rose from 0.99 in the normal slag to 1.07 in the improved slag. And the Base Number increased from 1.06 to 1.14 without adversely affecting the glass content of 97 percent.

TABLE II

| Sample | Normal Slag 1 | Slag with addition of Quicklime 2 |
|---|---|---|
| Chemical Anylsis % | | |
| $SiO_2$ | 37.5 | 36.3 |
| (IR) | (0.14) | (0.18) |
| $Al_2O_3$ | 9.8 | 9.4 |
| $Fe_2O_3$ | 1.0 | 0.7 |
| CaO | 37.1 | 38.8 |
| LOI ($N_2$) | 0.1 | <0.1 |
| LOI (Air) | +(0.8) | +(0.8) |
| MgO | 12.9 | 13.1 |
| $Mn_2O_3$ | 0.65 | 0.41 |

TABLE II-continued

| Sample | Normal Slag 1 | Slag with addition of Quicklime 2 |
|---|---|---|
| $P_2O_5$ | 0.01 | 0.01 |
| $TiO_2$ | 0.44 | 0.35 |
| $SO_3$ + S as $SO_3$ | (1.73) | (1.97) | mixtures were tested along with unblended OPC to determine their seven (7) and twenty-eight (28) day mortar strengths in accordance with ASTM C109 and their two (2), seven (7), and twenty-eight (28) day mortar strengths in accordance with EN196-1. The results of these tests are presented in Table III. A standard laboratory ball mill grinder was also used to estimate the energy required to grind each sample to a Blaine fineness of about 4500, 5000, and 6000 cm$^2$/g. These estimates are presented in Table IV.

TABLE III

| Samples | Plymstock OPC | Normal Slag (No. 1) 50/50 OPC/Slag Blends | | | Slag with addition of Quicklime (No. 2) 50/50 OPC/Slag Blends | | |
|---|---|---|---|---|---|---|---|
| Specific Surface Area, cm$^2$/g ATSM-C204 | 4080 | 4500 | 5000 | 6000 | 4500 | 5000 | 6000 |
| ATSM-C109 Compressive Strengths PSI | | | | | | | |
| 7 day | 4334 | 4125 | 4371 | 4600 | 4179 | 4665 | 5294 |
| % of OPC | 100 | 95.2 | 100.9 | 106.1 | 96.4 | 107.6 | 122.2 |
| % of normal slag blend (Equivalent fineness) | — | 100 | 100 | 100 | 101.3 | 106.7 | 115.1 |
| 28 day | 5402 | 5860 | 6171 | 6394 | 6101 | 6101 | 6999 |
| % of OPC | 100 | 108.5 | 114.2 | 118.4 | 112.9 | 112.9 | 129.6 |
| % of normal slag blend (Equivalent fineness) | — | 100 | 100 | 100 | 104.1 | 104.1 | 109.5 |
| EN 196 Compressive Strengths N/mm$^2$ | | | | | | | |
| 2 day | 31.6 | 11.7 | 12.4 | 13.2 | 12.8 | 13.4 | 14.1 |
| % of OPC | 100 | 37.0 | 39.2 | 41.8 | 40.5 | 42.4 | 44.6 |
| % or normal slag blend (Equivalent fineness) | — | 100 | 100 | 100 | 109.4 | 108.1 | 106.8 |
| 7 day | 46.4 | 27.4 | 29.1 | 32.0 | 32.9 | 35.5 | 40.4 |
| % of OPC | 100 | 59.1 | 62.7 | 69.0 | 70.9 | 76.5 | 87.1 |
| % of normal slag blend (Equivalent fineness) | — | 100 | 100 | 100 | 120.1 | 122.0 | 126.3 |
| 28 day | 56.6 | 56.7 | 58.9 | 59.7 | 59.6 | 63.8 | 65.0 |
| % of OPC | 100 | 96.8 | 100.5 | 101.9 | 101.7 | 108.9 | 110.9 |
| % of normal slag blend (Equivalent fineness) | — | 100 | 100 | 100 | 105.1 | 108.3 | 108.9 |

TABLE II-continued

| Sample | Normal Slag 1 | Slag with addition of Quicklime 2 |
|---|---|---|
| S | 0.66 | 0.76 |
| $K_2O$ | 0.23 | 0.24 |
| $Na_2O$ | 0.25 | 0.29 |
| Free Quicklime | <0.1 | <0.1 |
| $CaO/SiO_2$ | 0.99 | 1.07 |
| Base Number $(CaO + MgO)/SiO_2$ | 1.06 | 1.14 |
| Hydraulic Index = $\dfrac{CaO + MgO + Al_2O_3}{SiO_2}$ | 1.59 | 1.69 |
| % Glass content (BS6699) | 97 | 97 |
| Crystalline phases identified by XRD | Trace of Merwinite | Merwinite and a trace of Calcite |

Portions of each of these samples were ground in a laboratory ball mill grinder to a Blaine fineness, as defined by ASTM C204, of about 5000 and 6000 cm$^2$/g. Each of these ground portions was then mixed with an Ordinary Portland Cement (OPC) to form a 50—50 blend. These These estimates may be higher than the energy required to grind such slags on a commercial scale. In commercial grinding, a grinding aid, such as a liquid chemical agent, e.g., triethanolamine or monopropylene glycol, may be used in conjunction with a ball mill grinder to improve the efficiency of the ball mill grinder. Further, the ball mill grinder air may be swept to remove fines, and the ground, granulated slag may be continuously passed through a separator, so that fines and sufficiently ground slag will not interfere with the grinding process. Nevertheless, these results suggest the difference between the relative grindability of the slag, i.e., the ease or difficulty of grinding the slag samples, and the relative amounts of energy necessary to grind the samples to a predetermined degree of fineness.

TABLE IV

| Samples | Normal Slag (No. 1) | | Slag with addition of Quicklime (No. 2) | |
|---|---|---|---|---|
| | Gross kWh/tonne | cm$^2$ g$^{-1}$ | Gross kWh/tonne | cm$^2$ g$^{-1}$ |
| | 1.27 | 7.0 | 1.7 | 10 |
| | 29.47 | 1750 | 31.72 | |
| | 33.44 | 2080 | 33.54 | 1970 |

TABLE IV-continued

| Samples | Normal Slag (No. 1) | | Slag with addition of Quicklime (No. 2) | |
|---|---|---|---|---|
| | Gross kWh/tonne | cm² g⁻¹ | Gross kWh/tonne | cm² g⁻¹ |
| | 37.67 | 2190 | 36.54 | 2090 |
| | 39.90 | 2280 | 41.74 | 2210 |
| | 44.37 | 2450 | 49.15 | 2430 |
| | 51.07 | 2680 | 59.52 | 2710 |
| | 63.67 | 3130 | | 3080 |
| | 81.43 | 3720 | 72.83 | 3540 |
| | 101.44 | 4190 | 95.04 | 4090 |
| | 134.71 | 4920 | 128.32 | 4920 |
| | 167.94 | 5520 | 161.55 | 5520 |
| | 196.77 | 5960 | 194.78 | 6040 |
| Estimated Energy Requirements (Gross kWh/tonne At Specific Surface Area | | | | |
| 5000 cm² g⁻¹ | 140 | | 133 | |
| 5500 cm² g⁻¹ | 168 | | 162 | |
| 6000 cm² g⁻¹ | 198 | | 192 | |

Based on the information provided in Tables III and IV, it can be concluded that over a fineness range of about 5000 to 6000 cm²/g, the slag to which quicklime was added requires about four (4) percent less energy to grind to a predetermined degree of fineness than normal slag. Further, by mixing quicklime with the molten slag, the hydraulic reactivity of the slag increased such that in order to achieve the same seven (7) day strengths, normal slag must be ground at least about 1000 cm²/g more finely than the improved slag. The process, therefore, would result in a savings of about 33 percent of the energy required for grinding. Moreover, to produce ground, granulated slags with the same seven (7) day strength as normal slag with a surface area of 5000 cm²/g, the surface area of the improved slag could be lowered by at least about 300 cm²/g. This would result in an energy savings of about 16 percent over the energy required for grinding normal slag.

Figure 3:
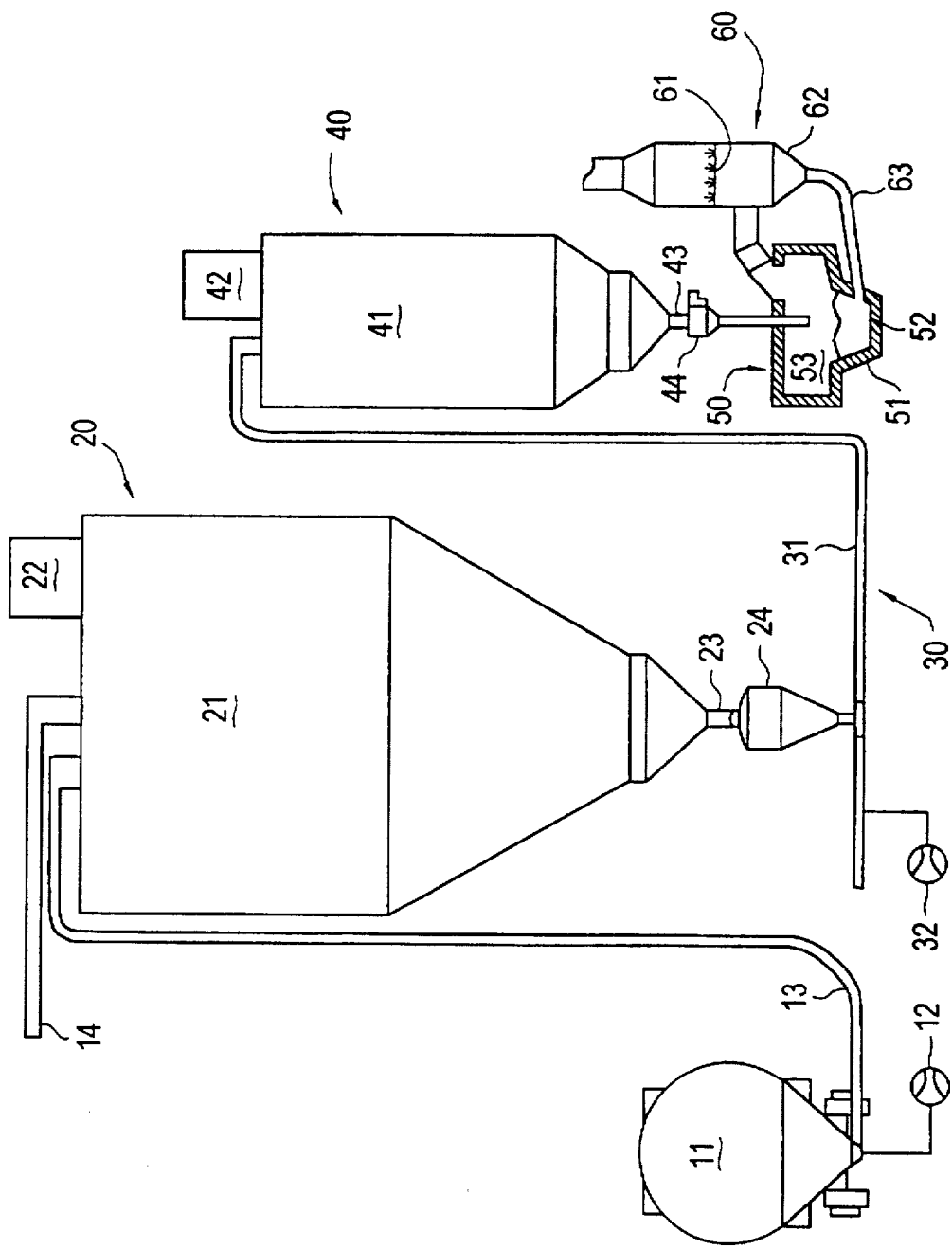
FIG. 3 is a schematic view showing a preferred embodiment of the system of the invention.

FIG. 3 represents a preferred embodiment of a system for performing the process disclosed above. The dimensions and capacities indicated are dictated in part by the blast furnace operations conducted at Bethlehem Steel's Sparrows Point Facility. Referring to FIG. 3, means for delivering a source of CaO 10 preferably comprises a railcar 11 and a spur (not shown) and piping 13 for offloading the source of CaO from railcar 11 to a centrally located storage bin 20. Alternatively, a direct fill pipeline 14 may be used to pipe a source of CaO from a ship, barge, or other facility to storage bin 20. Preferably, direct fill pipeline 14 has a diameter of at least about 5 inches (12.7 cm). A dry air compressor 12 provides dry compressed air to piping 13 for pneumatically transferring the source of CaO from railcar 11 to storage bin 20.

Storage bin 20 comprises a bulk storage chamber 21, a pneumatic transfer vessel 24, and piping 23 for placing storage chamber 21 in communication with transfer vessel 24. Storage chamber 21 is pressurized with dry compressed air, so that the source of CaO can be transferred from storage chamber 21 to transfer vessel 24. It is preferred that storage chamber 21 has a capacity of about 200 to 300 short tons. A dust collector 22 is mounted on storage chamber 21 to collect the caustic dust released during the delivery of the source of CaO to storage chamber 21.

Means of transferring the source of CaO 30 from transfer vessel 24 to injection bin 40 comprises transfer piping 31 which joins transfer vessel 24 to injection chamber 41 and at least one, but preferably two, dry air compressors 32 supply dry compressed air to pneumatically transfer the source of CaO from transfer vessel 24 to injection chamber 41. It is further preferred that at least one dry air compressor 32 produces dry compressed air at pressures sufficient to transfer the source of CaO at a rate of about six (6) TPM.

Injection bin 40 comprises injection chamber 41, a volumetric feeder 44, and piping 43 for connecting injection chamber 41 to volumetric feeder 44. Preferably, injection chamber 41 has a capacity of about 30 short tons. It is preferred that the source of CaO is transferred from injection chamber 41 to volumetric feeder 44 by means of dry compressed air. Alternatively, however, injection chamber 41 can be mounted above volumetric feeder 44, and the source of CaO can be gravity fed to volumetric feeder 44. It is further preferred that volumetric feeder 44 is capable of delivering a source of CaO at delivery rates between about three (3) and seven (7) TPM. A variety of suitable volumetric feeders, such as the Acrison 102Z, are commercially available. Preferably, suitable volumetric feeders should be capable of feeding the source of CaO at variable rates up to about 300 cubic feet (8.496 cubic meters) per hour. Alternatively, however, the source of CaO may be mixed with the molten slag by a feeder that measures the weight, rather than the volume, of the CaO to be added. A dust collector 42 is mounted on injection chamber 41 to collect caustic dust released during the transfer of the source of CaO to injection chamber 41.

Figure 4A:
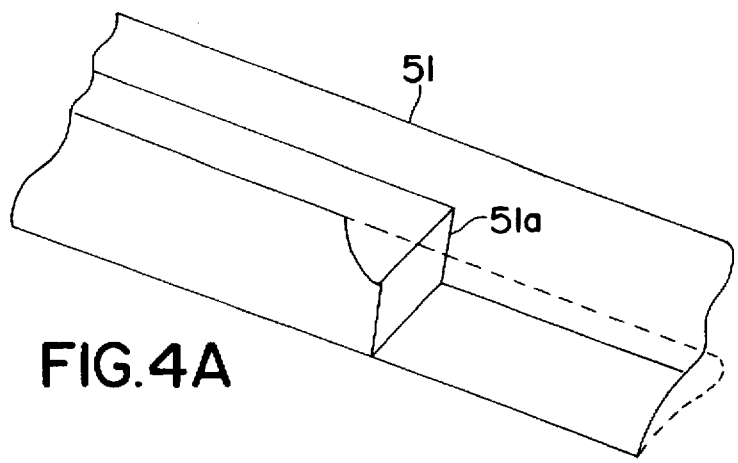
FIGS. 4A, 4B and 4C depict partially cut-away slag runners equipped with a waterfall-type step, a baffle projection, and a ripple generating projection, respectively.
Figure 4B:
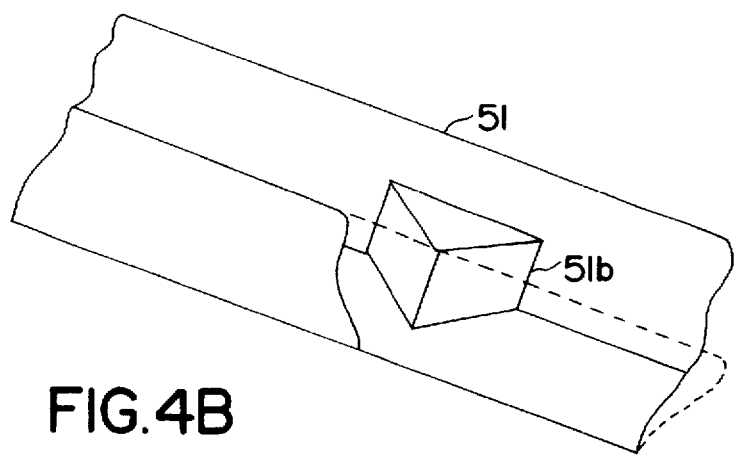
Figure 4C:
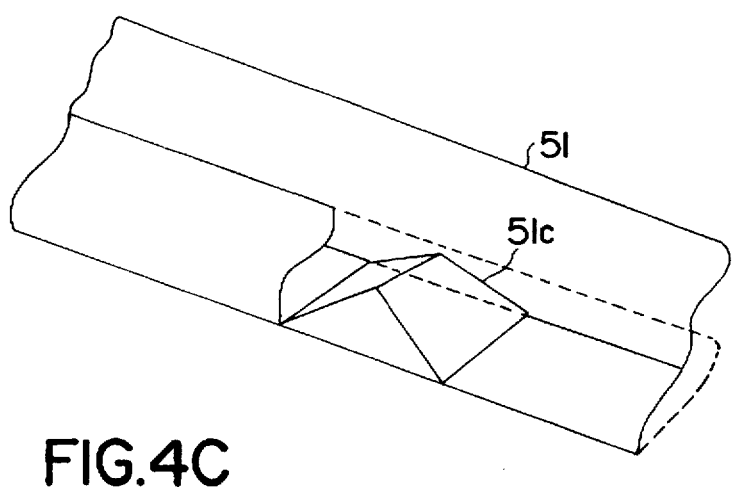

The source of CaO is mixed with molten slag 52 in a slag runner 51 at a mixing point 50. Slag runner 51 is preferably constructed of fire brick or castable refractory material. Preferably, mixing is accomplished supplying appropriately ground quicklime to slag 52 by means of volumetric feeder 44. Referring to FIGS. 4A, 4B and 4C, slag runner 51 may also be equipped with a means for creating turbulence in slag 52 at point of mixing 50. In FIG. 4A, a preferred means for creating turbulence is a waterfall-type step 51b formed in slag runner 51. It may not always be possible to add such a step to an existing slag runner because the gradient of the slag runner was established when the blast furnace was built. In these cases, it may be preferred that as depicted in FIG. 4B, a baffle projection 51b is mounted on the side of slag runner 51 as depicted in FIG. 4C or a ripple generating projection 51c is mounted on the floor of slag runner 51. These wedge-shaped projections may cause slag 52 to fold back on itself and create the desired turbulence at mixing point 50.

Slag runner 51 may be equipped with means for sampling (not shown) slag 52 as it flows from the blast furnace. These means for sampling are a component of the means for determining the molten slag's chemical composition (not shown). Slag runner 51 may also be equipped with means for measuring the rate of flow (not shown) of slag 52 in slag runner 51. Preferably, the means for determining the chemical composition of the molten slag are capable of the continuous sampling of slag 52 and the continuous analysis of such slag samples. It is also preferred that the means for measuring the rate of flow of slag 52 is a flowmeter (not shown) capable of continuously measuring the rate of flow of slag 52 in slag runner 51. It is further preferred that the output from the means for determining the chemical composition of slag 52 and the output from the means for measuring the rate of flow of the slag 52 are provided to a volumetric feeder control unit (not shown) such that volumetric feeder 44 can be automatically adjusted to provide sufficient amounts of the source of CaO to increase the C/S Ratios of slag 52 to the range of about 1.06 to 1.25.

Preferably, means for collecting and removing caustic dust released during mixing of the source of CaO and slag 52 are located at mixing point 50. Slag runner 51 is preferably enclosed in a dedusting chamber 53. A fan (not shown) draws air and caustic dust from dedusting chamber 53 and into a scrubber 60. It is preferred that scrubber 60 is equipped with means for separating the air and the caustic dust 61, such as water spray heads. It is further preferred that scrubber 60 is equipped with means for collecting the caustic dust 62 and a return line 63 for returning the collected caustic dust to slag 52. Alternatively, a dry dust collector (not shown) could be used to remove caustic dust from the air. In a dry dust collector, air and dust are passed through a permeable fabric on which the dust collects. Dust is then recovered from the fabric by use of compressed air or by mechanical means, e.g., shaking. Use of dry dust collectors, however, is limited by to the heat to which the fabric can be subjected.

It is preferred that slag runner 51 directs slag 52 to a granulating station (not shown). The granulating station is preferably equipped with at least one fluid jet outlet (not shown) for injecting fluid(s) at a temperature sufficiently low to quench the molten slag and in sufficient quantity and under sufficient pressure into the molten slag. This fluid injection quenches and breaks up the slag, thereby granulating it. Preferably, the fluid is water at ambient temperature, and it is injected into the molten slag at a rate of about ten (10) times the rate of flow of the molten slag and at a pressure of about 30 psi (1551 torr).

Although wet granulated slag can be ground, it is preferred that the granulated slag is dewatered as part of the step of grinding the granulated slag. This can be accomplished by heating the granulated slag to promote evaporation of the excess water. Dewatering by this method, however, may require the expenditure of additional energy and the creation of additional structures in which to heat the wet, granulated slag. The preferred method of dewatering the granulated slag is simply to transfer the granulated slag to a filter bed area in which the excess water can drain from the granulated slag naturally. Alternatively, the granulated slag may be dewatered by use of a rotating slag drum which can operate at a relatively low speed and uses gravitational force to dewater the slag.

It is further preferred that as part of the step of grinding the granulated slag, the water content of the granulated slag is reduced to a range of about two (2) to three (3) percent. If necessary, a dryer or integral grinder drying chamber may be a preferred means of reducing the water content to the desired range.

Before the granulated slag is ground, its chemical composition should be determined and the degree of fineness required to obtain a predetermined reactivity should be calculated. Means for measuring the granulated slag's chemical composition (not shown) preferably comprise a means for drawing a sample of the slag after granulation and means for analyzing the sample to determine its chemical composition. It is further preferred that the measuring of the chemical composition is continuous and that the output of this measuring is provided to a grinder control unit (not shown). Preferably, the grinder control unit will instruct the grinder (not shown) as to the degree of fineness desired, given the desired characteristics of the cementitious material and the chemical composition of the granulated slag.

It is also preferred that the grinder (not shown) is a ball mill (or tube) grinder. Such grinders are generic commutation grinders and are available from a variety of commercial sources. A ball mill grinder comprises a large diameter, steel cylinder which is filled with cast alloy balls of sizes that may range between about 0.625 and 4 inches (1.588 and 10.16 cm) in diameter. The granulated slag enters one end of the cylinder and is ground between the balls as the cylinder is rolled. The ground, granulated slag discharged from the other end of the cylinder is separated into two categories. Slag that has been sufficiently ground can be added together with an activator to form a cementitious material. Slag that is too coarsely ground is returned to the grinder for further grinding. Alternatively, a high pressure roll compression grinder may be used instead of or in conjunction with the ball mill grinder.

The preferred means of adding an activator to the ground granulated slag is to mix it with Portland Cement and add water. The reaction of the Portland Cement and the water produces excess quantities of calcium hydroxide. The mixing of the ground granulated slag with the appropriate amount of Portland Cement is preferably performed by commercially available proportioners.

The dimensions and capacities provided for the various components of the system may be varied to accommodate different blast furnaces, facilities, and production parameters. Although a detailed description of the present invention has been provided above, it is understood that the scope of the process and the system are not to be limited thereby, but are to be determined by the claims which follow.

I claim:

1. A system for producing a cementitious material from molten ferrous slag comprising:

means for mixing a source of CaO with molten ferrous slag at a rate at a mixing point, so that a ratio of CaO to $SiO_2$ in a range of about 1.06 to 1.25 is obtained, and said slag has a Base Number equal to $(CaO+MgO)/SiO_2$ and said Base Number is less than about 1.55;

means for granulating by breaking up and quenching said molten slag to produce granulated slag; and means for grinding said granulated slag to a degree of fineness.

2. The system of claim 1 wherein said means for granulating comprises a granulating station at which fluid at a temperature sufficiently low to quench said molten slag is injected into said molten slag in sufficient quantity and under sufficient pressure to granulate said molten slag.

3. The system of claim 1 wherein said source of CaO is dolomitic quicklime.

4. The system of claim 1 wherein said source of CaO is lime and further comprising means for mixing a low volatile fuel into said molten slag.

5. The system of claim 3 further comprising means for injecting oxygen into said molten slag.

6. The system of claim 1 wherein said source of CaO is limestone and further comprising means for mixing a low volatile fuel into said molten slag.

7. The system of claim 6 further comprising means for injecting oxygen into said molten slag.

8. The system of claim 1, wherein said means for mixing comprises at least one projection formed on a slag runner for creating turbulence in said slag.

9. The system of claim 8, wherein said projection is wedge-shaped.

10. The system of claim 8, wherein said projection is a step formed in said slag runner.

11. The system of claim 8, wherein said slag runner has a floor wall and said projection is a ripple generating projection mounted on said floor wall.

12. A system for producing a cementitious material from molten ferrous slag comprising:

means for mixing a source of CaO with molten ferrous slag at a rate at a mixing point, so that a ratio of CaO to $SiO_2$ in a range of about 1.06 to 1.25 is obtained, and said slag has a Base Number equal to $(CaO+MgO)/SiO_2$ and said Base Number is less than about 1.55;

means for granulating said molten slag to produce granulated slag, so that said granulated slag has a glass content of at least about 90 percent; and means for grinding said granulated slag to a degree of fineness.

13. The system of claim 12, wherein said granulated slag has a glass content in a range of about 90 to 95 percent.

14. A system for producing a cementitious material from molten ferrous slag comprising:

means for providing quicklime with an average diameter of about 0.375 inches (0.953 cm);

means for mixing said quicklime with molten ferrous slag at a rate at a mixing point, so that a ratio of CaO to $SiO_2$ in a range of about 1.06 to 1.25 is obtained, and said slag has a Base Number equal to $(CaO+MgO)/SiO_2$ and said Base Number is less than about 1.55;

means for granulating said molten slag to produce granulated slag; and means for grinding said granulated slag to a degree of fineness.

* * * * *